Feb. 22, 1938.                  E. E. HEWITT                     2,109,047
                              FLUID PRESSURE BRAKE
                              Filed June 2, 1937

INVENTOR
ELLIS E. HEWITT.
BY
ATTORNEY

Patented Feb. 22, 1938

2,109,047

UNITED STATES PATENT OFFICE 2,109,047

FLUID PRESSURE BRAKE

Ellis E. Hewitt, Edgewood, Pa., assignor to The Westinghouse Air Brake Company, Wilmerding, Pa., a corporation of Pennsylvania Application June 2, 1937, Serial No. 145,978

17 Claims. (Cl. 303—46)

This invention relates to a fluid pressure brake and more particularly to an improved emergency valve device of the type shown in the application of H. R. Fuehrer, Serial No. 88,075, filed June 30, 1936, and in the application of John Canetta, Serial No. 88,130, filed June 30, 1936.

In the above identified applications there is shown an emergency valve device comprising a movable abutment subject to the opposing pressures of the fluid in the brake pipe and of the fluid in a pressure chamber, and controlling a passage through which fluid under pressure may flow between the brake pipe and the pressure chamber. This passage has a choke or restriction therein which limits the rate of flow of fluid through the passage to a rate which will enable fluid from the pressure chamber to flow to the brake pipe to reduce the pressure of the fluid in the pressure chamber substantially as rapidly as the pressure of the fluid in the brake pipe is reduced on a reduction in brake pipe pressure at a service rate to thereby prevent sufficient differential being developed between the pressures in the pressure chamber and in the brake pipe to cause the abutment to be moved to the application position.

The choke or restriction in this passage does not have sufficient flow capacity to permit the pressure of the fluid in the pressure chamber to reduce as rapidly as brake pipe pressure is reduced upon a reduction in brake pipe pressure at an emergency rate, and as a result, the fluid in the pressure chamber moves the abutment to the emergency application position.

The valve devices shown in each of the above identified applications incorporate valve means to prevent flow of fluid from the brake pipe to the pressure chamber through the passages controlled by the abutments until a predetermined pressure is established in the brake pipe. This pressure is such that sufficient force is exerted on the abutments to insure their movement to positions to completely open the ports to which are connected the passages leading to the pressure chambers.

In the aforementioned application of H. R. Fuehrer there is shown valve mechanism for controlling the rate of supply of fluid from the brake pipe to the pressure chamber through the passage controlled by the abutment to restrict recharging of the pressure chamber after an emergency application of the brakes, to thereby prevent a possible overcharge of the pressure chamber, and to cause sufficient pressure differential to be developed between the pressure of the fluid in the brake pipe and in the pressure chamber to move the abutment to an inner release position in which a communication is established through which fluid may flow from the brake cylinder to the brake pipe.

The valve mechanism shown in the application of H. R. Fuehrer is operated by an abutment which is subject to the opposing pressures of the fluid in the pressure chamber, and of the fluid in an operating chamber open to the passage controlled by the abutment at a point in this passage intermediate the pressure chamber and the choke or restriction in the passage. The valve controlled by this abutment is normally held in the open position, and on an increase in brake pipe pressure following an emergency application of the brakes, fluid is supplied to the operating chamber to cause the valve to be moved to the closed position before the valve means associated with this passage operates to open communication through the passage and permit fluid to be supplied to the pressure chamber. The valve mechanism will remain in the closed position until the pressure of the fluid in the pressure chamber increases substantially to the pressure in the brake pipe as the supply of fluid to the pressure chamber is at a restricted rate, and the pressure therein will not increase as rapidly as brake pipe pressure is increased in effecting a release of the brakes.

When the pressure of the fluid in the pressure chamber increases substantially to the pressure carried in the brake pipe, the valve associated with this valve mechanism is moved to the open position to permit rapid flow of fluid between the pressure chamber and the brake pipe through this passage, and thereby equalize the pressures in the pressure chamber and in the brake pipe.

On a reduction in brake pipe pressure to effect a service application of the brakes, the pressure of the fluid in the pressure chamber is reduced only to the same extent as brake pipe pressure is reduced, and the pressures to which the abutment of the valve mechanism is subject remaining substantially equal, the valve of this valve mechanism remains in the open position.

In addition, on a reduction in brake pipe pressure to effect a service application of the brakes, the brake pipe pressure is maintained at a value high enough to maintain in the open position, the valve means employed in the emergency valve devices shown in the above identified applications and controlling the passages through which fluid under pressure flows between the brake pipe and the pressure chambers in the valve devices.

On a subsequent increase in brake pipe pressure to effect a release of the brakes, fluid flows at a rapid rate from the brake pipe to the pressure chamber, and increases the pressure of the fluid in the pressure chamber substantially as rapidly as the pressure in the brake pipe is increased. Accordingly no pressure differential will be developed in the chambers at the opposite sides of the abutment of the valve mechanism for controlling the rate of supply of fluid to the pressure chamber, and the valve of this valve mechanism will remain in the open position and permit a rapid flow of fluid from the brake pipe to the pressure chamber.

In order to insure the release of the brakes following an application, fluid under pressure is initially supplied to the brake pipe at a pressure substantially higher than that normally carried in the brake pipe, and thereafter fluid is supplied to the brake pipe by a feed valve device at the pressure carried in the brake pipe.

In the emergency valve devices shown in the above identified applications, as fluid under pressure is supplied from the brake pipe to the pressure chamber at a rapid rate on the release of the brakes following a service application, when fluid is supplied to the brake pipe at a pressure higher than normal, the pressure chambers of these valve devices may be charged with fluid at the pressure supplied to the brake pipe. There is a possibility on a subsequent reduction in brake pipe pressure as the result of equalization of the brake pipe pressure throughout the train, that the pressure of the fluid in the pressure chambers of these valve devices cannot reduce by flow to the brake pipe as rapidly as brake pipe pressure is reduced, and that the higher pressure in the pressure chambers will cause the abutments of these valve devices to be moved to their application positions, thereby producing an unintended emergency application of the brakes.

It is an object of this invention to provide an improved emergency valve device of the type described, and arranged to prevent an overcharge of the pressure chamber on an increase in brake pipe pressure to effect the release of the brakes.

A further object of the invention is to provide an improved emergency valve device of the type described and incorporating means operative on an increase in brake pipe pressure to restrict the rate of supply of fluid from the brake pipe to the pressure chamber of the valve device.

Another object of the invention is to provide in an emergency valve device having a movable abutment subject to the opposing pressures of the fluid in a pressure chamber and in the brake pipe and controlling a passage through which fluid may flow between the brake pipe and the pressure chamber, the passage having a restriction interposed therein to control the rate of fluid therethrough, valve means subject to the opposing pressures of the fluid in the pressure chamber and of the fluid in a chamber open to the passage at a point therein intermediate the restriction and the brake pipe for controlling the rate of flow of fluid through said passage, whereby the valve means will be operated on an increase of the brake pipe pressure following a service application of the brakes.

A further object of the invention is to provide an improved emergency valve device.

Other objects of the invention and features of novelty will be apparent from the following description taken in connection with the accompanying drawing, the single figure of which is a diagrammatic view, largely in section, of a brake equipment incorporating an emergency valve device embodying my invention.

Figure 1:
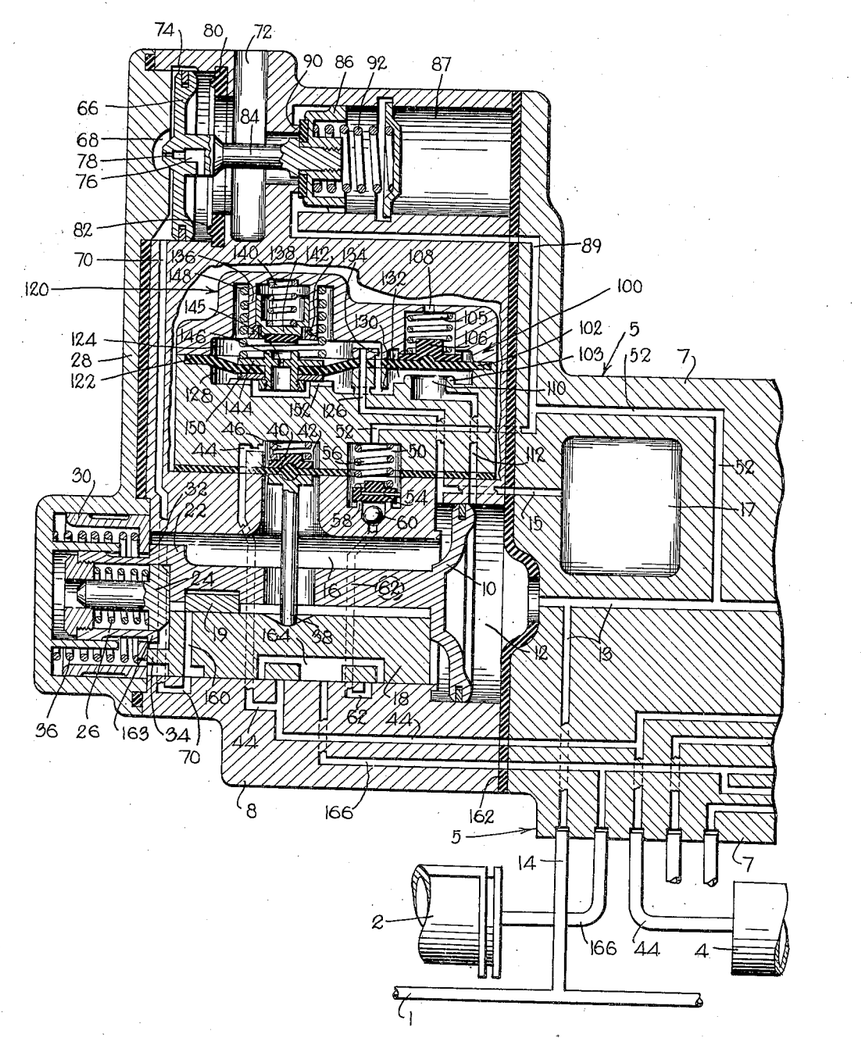

Referring to the drawing, the brake equipment illustrated therein comprises a brake pipe 1, a brake cylinder 2, an emergency reservoir 4, and a brake controlling valve device indicated generally by the reference numeral 5.

The brake controlling valve device 5 comprises a pipe bracket section 7 having a mounting face thereon against which is secured the emergency valve portion 8 provided by this invention, while the pipe bracket section 7 has another mounting face, not shown, formed thereon, against which is secured the service portion, not shown, of the brake controlling valve device.

The emergency valve portion 8 provided by this invention is an improvement on the corresponding emergency valve portion of the brake controlling valve device shown and claimed in U. S. Patent No. 2,031,213, issued February 18, 1936, to Clyde C. Farmer, and only such portions of the construction and operation of the valve device are illustrated and described in this application as are essential to the understanding of this improvement.

The emergency valve portion 8 comprises a body having a bore therein in which is mounted a movable abutment in the form of a piston 10 having at one side thereof a chamber 12, which is connected by way of a passage 13 in the pipe bracket section 7 with a branch pipe 14 which communicates with the brake pipe 1. The piston 10 has at the other side thereof a valve chamber 16 in which is mounted a main slide valve 18, and an auxiliary slide valve 19 having movement relative to the main slide valve 18. The main slide valve 18 and the auxiliary slide valve 19 are operated by the piston 10 through a stem 22 formed integral with the piston. The valve chamber 16 is connected by way of a passage 15 with a quick action or pressure chamber 17 formed in the pipe bracket section 7.

The stem 22 of the piston 10 has a bore in the end thereof in which is mounted a plunger 24, which is yieldingly pressed against the end of the main slide valve 18 by means of a spring 26.

The end of the valve chamber 16 is closed by means of a cover 28, and this cover has a bore therein in which is mounted a plunger 30 which is adapted to be engaged by a shoulder 32 on the piston stem 22, and by a projection 34 on the end of the main slide valve 18. The plunger 30 is yieldingly urged to the right, as viewed in the drawing, by a coil spring 36, while movement of the plunger in this direction is limited by engagement of the plunger with the body of the emergency portion 8.

The main slide valve 18 is held in engagement with its seat by means of a strut 38 which engages one face of a diaphragm 40. The other face of the diaphragm 40 is subject to the pressure of the fluid in the chamber 42 which is constantly connected by way of a passage and pipe 44 with the emergency reservoir 4. The diaphragm 30 is also subject to the pressure of a spring 46 mounted in the chamber 42.

The body of the emergency portion 8 has formed therein a chamber 50 which is constantly connected by way of a passage 52 with the passage 13 in the pipe bracket section 7, and thereby through the branch pipe 14 to the brake pipe 1. An accelerated release check valve 54 is mounted in the chamber 50, and is yieldingly urged by means of a spring 56 into engagement with a seat rib 58, while a ball check valve 60 is mounted in the chamber within the seat rib 58 and is adapted to engage a seat formed on the body 1 surrounding a passage 62 which communicates with a port in the seat of the main slide valve 18.

The body of the emergency section 8 also has a bore therein in which is mounted a vent valve piston 66 having at one side thereof a chamber 68 which is constantly connected by way of a passage 70 with a port in the seat of the main slide valve 18.

The chamber at the other face of the vent valve piston 66 is open to the atmosphere by way of a passage 72, while the body of the emergency section has a groove 74 therein, which in one position of the piston 66 extends around the piston so as to permit communication between the chamber 68 and the chamber on the opposite face of the vent valve piston 66.

The piston 66 has a passage 76 extending therethrough so as to permit fluid to flow from the chamber 68 to the chamber on the opposite face of the piston, and thence to the atmosphere by way of the passage 72. The passage 76 has a choke 78 interposed therein to restrict the rate of flow of fluid from the chamber 68.

The body of the emergency valve portion 8 has a groove formed therein adjacent the end of the bore in which the vent valve piston 66 is mounted, and in this groove is secured a sealing gasket 80 having formed thereon an annular seat rib 82, which is adapted to be engaged by the face of the piston 66 to cut off communication from the chamber 68 around the periphery of the piston 66.

The piston 66 has formed integral therewith a stem 84 which has secured thereon a vent valve 86 which is mounted in a chamber 87 formed in the body of the emergency portion 8 and constantly connected by way of a passage 89 with the passage 52, and thereby with the brake pipe branch passage 13 and branch pipe 14. The vent valve 86 is yieldingly urged against an annular seat rib 90 by means of a coil spring 92 to cut off communication between the chamber 87 and the atmospheric passage 72.

The emergency portion 8 shown in the drawing has valve means, indicated generally by the reference numeral 100, for controlling the supply of fluid under pressure from the brake pipe to the valve chamber 16 and the pressure chamber 17.

As shown in the drawing, the valve means 100 comprises a movable abutment in the form of a diaphragm 102 which is urged into engagement with an annular seat rib 103 by means of a spring 105 acting through a spring seat 106 which engages a face of the diaphragm. The spring 105 is mounted in a chamber which is constantly connected to the atmosphere by way of a passage 108.

The chamber 110 within the seat rib 103 is constantly connected by way of a passage 112 with a port in the bore in the body of the valve portion in which the piston 19 is mounted.

The emergency portion 8 includes valve mechanism, indicated generally by the reference numeral 120, for controlling the rate of flow of fluid from the valve means 100 to the valve chamber 16 and the pressure chamber 17. As shown in the drawing this valve mechanism comprises a movable abutment in the form of a diaphragm 122 which is subject on one side to the pressure of the fluid in a chamber 124, which is constantly connected by way of a passage 126 with the valve chamber 16 and the pressure chamber 17.

The diaphragm 122 is subject on the other face to the pressure of the fluid in an operating chamber 128 which is constantly connected by way of a passage 130 with the chamber 132 at the face of the diaphragm 102 outwardly of the seat rib 103.

The chamber 124 is constantly connected with the passage 130 by way of a passage having a choke 134 interposed therein.

The body of the emergency portion 8 has a tubular portion 136 which extends into the chamber 124, while a valve 138 is mounted within this tubular portion and is yieldingly urged toward the open end of the tubular portion by a spring 140. A locking member 142 is secured on the tubular portion 136 and prevents movement of the valve 138 out of the tubular portion 136 by the spring 140.

The diaphragm 122 has a valve element 144 secured substantially centrally thereof and provided with an annular seat rib 146 which is adapted to engage a sealing gasket carried by the valve 138. A coil spring 148 is mounted in the chamber 124 outwardly of the tubular portion 136 and yieldingly presses the diaphragm 122 away from the valve 138, while a disc 150 on the lower face of the diaphragm 122 engages projections 152 formed on the body of the emergency portion to limit movement of the diaphragm by the spring 148.

The valve element 144 has a port 145 therein through which fluid under pressure may flow between the chambers 128 and 124, and thus between the brake pipe and the valve chamber 16 and the pressure chamber 17. The port 145 is proportioned to permit fluid to flow from the valve chamber 16 and the pressure chamber 17 at a rate rapid enough to enable the pressure of the fluid in the valve chamber to reduce substantially as rapidly as brake pipe pressure is reduced during a service reduction in brake pipe pressure, while the communication between the operating chamber 128 and the brake pipe is proportioned so that its flow capacity is substantially greater than the flow capacity of the port 145.

Similarly, the flow capacity of the passage 126 connecting the chamber 124 with the valve chamber 16, and the pressure chamber 17, is arranged to permit fluid supplied to the chamber 124 to flow therefrom to the valve chamber 16, and the pressure chamber 17, at a somewhat more rapid rate than fluid is supplied through the port 145 to prevent an increase in the pressure of the fluid in the chamber 124 above the pressure in the chambers 16 and 17.

The emergency valve portion provided by this invention is shown in the drawing in the normal release position, which is the position which it assumes when the brake equipment is fully charged. When the brake equipment is at atmospheric pressure, the diaphragm 102 of the valve means 100 is held in engagement with the seat rib 103 by the spring 105, while the other parts of the emergency valve portion may be in the position in which they are shown in the drawing.

In initially charging the equipment, fluid under pressure is supplied to the brake pipe 1, and it flows therefrom through the branch pipe 14 and the passage 13 to the chamber 12 at the face of the piston 19.

Fluid under pressure supplied to the passage 13 also flows to the service portion, not shown, of the brake controlling valve device 5, and causes the piston of this portion to move to the release position in which the brake cylinder 2 is connected to the atmosphere, and in which a communication is opened through which fluid under pressure may flow from the passage 13 to the auxiliary reservoir, not shown, and to the emergency reservoir 4 to charge these reservoirs with fluid under pressure.

Fluid under pressure supplied by the service portion of the brake controlling valve device 5 to the emergency reservoir 4 flows by way of the passage 44 to the chamber 42 at the face of the diaphragm 40, and increases the force exerted through the stem 38 to maintain the slide valve 18 in engagement with its seat.

Fluid under pressure supplied from the brake pipe 1 to the passage 13 flows to the chamber 12 at the face of the piston 10 of the emergency valve portion 8, and on an increase in the pressure of the fluid in this chamber, the piston 10 is moved to the left, as viewed in the drawing, to the normal release position, if it is not already in that position, which is the position in which it is shown in the drawing.

On movement of the piston 10 to the normal release position, communication is opened between the chamber 12 and the passage 112, and fluid under pressure will flow to the chamber 110 at the face of the diaphragm 102, which at this time is held in engagement with the seat rib 103 by the spring 105.

The spring 105 is of such value, and the chamber 110 within the seat rib 103 is of such area, that the diaphragm 102 is held in engagement with the seat rib 103 until the pressure of the fluid in the chamber 110 within the seat rib 103 has increased to a predetermined value, such as 12 pounds.

The increase in the pressure of the fluid in the chamber 110 at the face of the diaphragm 102 is accompanied by a similar increase in the pressure of the fluid in the chamber 12 at the face of the piston 10, and the fluid under pressure in this chamber exerts force on the piston to move it to the left, as viewed in the drawing, to the normal release position, if it is not already in this position, so as to fully open the port through which the passage 112 communicates with the chamber 12.

Movement of the piston 10 farther to the left, as viewed in the drawing, from the normal release position towards the inner release position, is resisted by the spring 36 acting through the plunger 30, which is engaged by a shoulder 32 on the piston stem 22, and by the projection 34 on the end of the main slide valve 18. The various parts of the emergency valve portion are arranged, however, so that the spring 36 and the plunger 30 are not effective to oppose movement of the piston 10 in this direction until the piston 10 has been moved to a position to completely open the port through which the passage 112 communicates with the chamber 12 at the face of the piston 10.

When the pressure of the fluid in the chamber 110 at the face of the diaphragm 102 is increased to a predetermined relatively high value, such as 12 pounds, the force exerted by the fluid under pressure in the chamber 110 on the diaphragm 102 is sufficient to overcome the opposing force of the spring 105, and the diaphragm 102 will be moved away from the seat rib 103 so as to permit fluid under pressure to flow from the chamber 110 within the seat rib 103, to the chamber 132 outwardly thereof, and thence by way of the passage 130 to the operating chamber 128.

As soon as the diaphragm 102 is moved away from the seat rib 103, and fluid under pressure is supplied to the chamber 132 outwardly of the seat rib 103, the entire area of the face of the diaphragm 102 is subject to the pressure of the fluid in the chambers 110 and 132, and the force exerted by this fluid under pressure on the diaphragm 102 will be substantially greater than that exerted by the fluid under pressure in the chamber 110 within the seat rib 103. As soon as the diaphragm 102 is moved away from the seat rib 103, therefore, there is a substantial increase in the force exerted by the fluid under pressure on this diaphragm, and the diaphragm is thereafter moved very quickly against the spring 105 until the spring seat 106 engages a portion of the body of the emergency valve portion 8 to prevent further movement of the diaphragm 102 against the spring 105.

On the supply of fluid under pressure to the operating chamber 128, there is an increase in the pressure of the fluid in this chamber, and as the flow capacity of the communication leading from the brake pipe to the chamber 128 is substantially greater than the flow capacity of the choke 145 through the valve element 144, fluid under pressure will not be supplied from the chamber 128 through the choke 145 as rapidly as fluid under pressure is supplied to the chamber 128, with the result that there will be a gradual increase in the pressure of the fluid in this chamber. When the pressure of the fluid in the operating chamber 128 is increased to a predetermined relatively high value, the diaphragm 122 is moved against the spring 148 so that the annular seat rib 146 carried by the valve element 144 engages the sealing gasket carried by the valve 138 to cut off the further supply of fluid under pressure from the chamber 128 through the choke 145 to the chamber 124, from which fluid under pressure flows by way of the passage 126 to the valve chamber 16 and the quick action chamber 17.

On a further increase in the pressure of the fluid in the operating chamber 128, the diaphragm 122 is moved farther against the spring 148, while the valve 138 is moved against the spring 149 until the valve element 144 engages the locking ring 142 to prevent further movement of the diaphragm 122 against the spring 148. It will be seen that the maximum force operative to press the valve 138 against the annular seat rib 146 on the valve element 144 is that exerted by the spring 149, and this force is limited to a value sufficient to maintain the valve 138 in engagement with the seat rib 146, but to prevent cutting or injury to the sealing gasket carried by the valve 138.

On the supply of fluid under pressure to the passage 132, fluid flows therefrom through the choke 134 to the passage leading to the chamber 124, and to the passage 126 leading to the valve chamber 16 and the pressure chamber 17. The flow of fluid under pressure through the choke 134 is maintained after the flow of fluid through the port 145 is cut off, and the pressure of the fluid in the chambers 16 and 17 is gradually increased by flow through the restricted port 134.

Upon an increase to a predetermined relatively high value in the pressure of the fluid in the chamber 124, which is connected to the chambers 16 and 17, the force exerted by the fluid under pressure in the chamber 124, supplemented by the force exerted by the spring 148, overcomes the opposing force of the fluid under pressure in the operating chamber 128, and the diaphragm 122 is moved downwardly, as viewed in the drawing, so as to move the annular seat rib 146 carried by the valve element 144 away from the valve 138, thereby opening communication through the port 145 through which fluid under pressure supplied from the brake pipe to chamber 128 flows at a rapid rate to the chamber 124, and thence by way of the passage 126 to the valve chamber 16 and the pressure chamber 17 to equalize the pressure of the fluid in these chambers with the pressure in the brake pipe.

On a subsequent reduction in the pressure of the fluid in the brake pipe 1 at a service rate to effect a service application of the brakes, the service portion, not shown, of the brake controlling valve device 5 operates, as described in detail in the above identified patent to Clyde C. Farmer, to close the communication through which fluid under pressure is supplied from the brake pipe 1 to the auxiliary reservoir, not shown, and to the emergency reservoir 4. In addition, the service portion operates to supply fluid under pressure from the auxiliary reservoir to the brake cylinder 2 until the pressure of the fluid in the auxiliary reservoir is reduced substantially to the pressure at which the pressure in the brake pipe is reduced.

Upon a reduction in the pressure of the fluid in the brake pipe 1 at a service rate, fluid under pressure flows from the valve chamber 16 and the pressure chamber 17 to the chamber 12 at the face of the piston 10 by way of the passage 126, chamber 124, port 145, operating chamber 128, passage 130 to the chamber 132, past the seat rib 103 to the chamber 110 and through the passage 112.

The port 145 is proportioned to permit fluid under pressure to flow from the chambers 16 and 17 at a rate which enables the pressure of the fluid in these chambers to be reduced substantially as rapidly as the pressure of the fluid in the chamber 12 at the face of the piston 10 is reduced during a reduction in brake pipe pressure at a service rate.

As the pressure of the fluid in the chambers 16 and 17 is reduced by the flow of fluid therefrom to the brake pipe substantially as rapidly as the pressure of the fluid in the chamber 12 is reduced during a reduction in the pressure of the fluid in the brake pipe at a service rate, no differential will be developed in the pressure of the fluid in the chambers on opposite sides of the piston 10, and the piston 10, therefore, will remain in the normal release position.

During service applications of the brakes, the pressure of the fluid in the brake pipe is maintained at a relatively high value, and the fluid under pressure in the chambers 110 and 132 acting on the face of the diaphragm 102 maintains the diaphragm away from the seat rib 103 against the opposing force of the spring 105.

As the diaphragm 122 of the valve mechanism 120 is subject to the opposing pressures of the fluid in the chambers 124 and 128, which communicate with the valve chamber 16 and with the brake pipe 1, respectively, the valve element 144 will be held away from the valve 138 during a service reduction in brake pipe pressure, because, as just described, the fluid pressure in the valve chamber 16 is reduced at substantially the same rate as the brake pipe pressure is reduced.

On a subsequent increase in the pressure of the fluid in the brake pipe to effect the release of the brakes, the service portion of the brake controlling valve device operates, as described in detail in the above identified patent, to release fluid under pressure from the brake cylinder 2, and to open a communication through which fluid under pressure is supplied from the brake pipe to the auxiliary reservoir, not shown, and to the emergency reservoir 4.

On this increase in the pressure of the fluid in the brake pipe there will be a similar increase in the pressure of the fluid in the chamber 12 at the face of the piston 10, and fluid under pressure will flow therefrom through the passage 112 to the chamber 110, and past the seat rib 103 to the chamber 132 and the passage 130 leading to the operating chamber 128.

If the pressure of the fluid in the brake pipe 1 is increased at a relatively rapid rate, as is the case when fluid is supplied to the brake pipe at a pressure higher than normally carried in the brake pipe in order to facilitate the release of the brakes, fluid will flow from the brake pipe to the operating chamber more rapidly than fluid can flow from the operating chamber 128 to the chamber 124, and thence to the valve chamber 16 and the pressure chamber 17, because, as stated above, the flow capacity of the communication between the chamber 12 and the operating chamber 128 is substantially greater than the flow capacity of the port 145. As a result, the pressure of the fluid in the operating chamber 128 will increase more rapidly than the pressure of the fluid in the chamber 124, and the higher pressure of the fluid in the operating chamber will move the diaphragm 122 against the spring 148 so that the seat rib 146 on the valve element 144 engages the sealing gasket carried by the valve 138 to cut off the flow of fluid to the port 145.

After this operation of the valve mechanism 120 to cut off the supply of fluid under pressure from the brake pipe to the valve chamber 16 and the pressure chamber 17 through the port 145, fluid is supplied at a restricted rate from the brake pipe to these chambers through the choke 134 until the pressure of the fluid in these chambers is increased substantially to the pressure in the brake pipe.

As the supply of fluid under pressure at this time to the chambers 16 and 17 is through the restricted port 134, the pressure of the fluid in these chambers will not increase rapidly, and considerable time will be required to charge these chambers to the pressure carried in the brake pipe. Before these chambers will have been charged to the pressure carried in the brake pipe, the supply of fluid under pressure to the brake pipe at the pressure higher than that normally carried in the brake pipe will have been cut off, and fluid will be supplied to the brake pipe only at the pressure normally carried in the brake pipe, while the pressure of the fluid in the brake pipe will have had an opportunity to equalize throughout the train before the chambers 16 and 17 are charged to the pressure normally carried in the brake pipe.

After a time interval the chambers 16 and 17 will have been charged with fluid under pressure substantially to the pressure present in the brake pipe, and the diaphragm 122 will thereupon be moved downwardly by the spring 148 to permit the flow of fluid from the brake pipe to the chambers 16 and 17 through the port 145, with the result that thereafter the pressure of the fluid in the chambers 16 and 17 is quickly equalized with the pressure in the brake pipe.

On a reduction in the pressure of the fluid in the brake pipe at an emergency rate to effect an emergency application of the brakes, the service portion, not shown, of the brake controlling valve device 5 operates, as described in detail in the above identified patent, to close the communication through which fluid under pressure is supplied from the brake pipe 1 to the auxiliary reservoir, not shown, and to the emergency reservoir 4, and to supply fluid under pressure from the auxiliary reservoir to the brake cylinder 2.

When the brake pipe pressure is reduced at an emergency rate, there will be a back flow of fluid from the valve chamber 16 of the emergency portion 8 to the brake pipe through the port 145, as in a service reduction in brake pipe pressure, but since the brake pipe pressure is now being reduced at an emergency rate, the pressure on the brake pipe side of the piston 10 will reduce more rapidly than the pressure in the valve chamber 16 can reduce by flow through the port 145. As a result a differential pressure is created in the valve chamber 16 which causes the piston 10 and the auxiliary slide valve 19 to be shifted relative to the main slide valve 18 against the opposing force of the spring 26 acting through the plunger 24.

On this movement of the piston 10 and the stem 22 relative to the main slide valve 18, the auxiliary slide valve 19 is moved relative to the main slide valve 18 to uncover a port 160 through the main slide valve 18, which, in this position of the main slide valve, communicates with the passage 70 leading to the chamber 68 at the face of the vent valve piston 66. When the auxiliary slide valve 19 is moved to a position to uncover the port 160 through the main slide valve 18, fluid under pressure from the chamber 16 flows through the port 160 to the passage 70, and therethrough to the chamber 68 at the face of the vent valve piston 66. The rate of flow of fluid under pressure through the passage 70 to the chamber 68 is substantially more rapid than the rate at which fluid under pressure may escape from the chamber 68 through the groove 74 around the piston 66, and through the choke 78 in the passage 76. As a result there will be a rapid increase in the pressure of the fluid in the chamber 68, and the vent valve piston 66 will be moved to the right, as viewed in the drawing. This movement of the piston 66 will be transmitted through the stem 84 to move the vent valve 86 away from the seat rib 90 against the opposing force of the spring 92 and of the fluid under pressure in the chamber 87.

On this movement of the piston 66, the face of the piston 66 is moved into engagement with the seat rib 82 on the gasket 80 so as to prevent the escape of fluid under pressure from the chamber 68 around the periphery of the piston.

On movement of the vent valve 86 away from the seat rib 90, a relatively large opening is provided through which fluid under pressure supplied from the brake pipe 1 by way of the branch pipe 14 and the passages 13, 52 and 89 to the chamber 87 is vented to the atmosphere by way of the atmospheric passage 72. There will, therefore, be a rapid reduction in the pressure of the fluid in the brake pipe 1, and also in the chamber 12 at the face of the piston 10, as this chamber communicates with the passage 13, and the piston 10 and the stem 22 will be rapidly moved to the right, as viewed in the drawing, by the higher pressure of the fluid under pressure in the chamber 16.

The piston 10 and the stem 22 are moved to the right, as viewed in the drawing, until the face of the piston engages the face of the gasket 162, which is clamped between the emergency portion 8 and the pipe bracket section 7. This is the emergency application position of the piston 10.

On movement of the piston 10 and the stem 22 a short distance towards the application position, a shoulder 163 on the piston stem 22 engages the end of the main slide valve 18 so that on further movement of the piston 10 and the stem 22 towards the application position, the main slide valve 18 is moved upon its seat and uncovers the end of the passage 70 so as to permit fluid under pressure from the chamber 16 to continue to flow to the passage 70, and therethrough to the chamber 68 at the face of the vent valve piston 66.

On movement of the piston 10 to the emergency application position, the main slide valve 18 is moved so that a cavity 164 therein establishes communication between a port in the seat of the slide valve to which is connected a branch of the passage 44, leading from the emergency reservoir 4, and a passage 166, leading to the brake cylinder 2, so that fluid under pressure will now flow from the emergency reservoir 4 to the brake cylinder 2.

Fluid under pressure supplied to the chamber 68 at the face of the vent valve piston 66 will be vented therefrom at a restricted rate through the choke 78 and the passage 76 in the piston 66. The volume of the chambers 16 and 17, and the rate of flow of fluid under pressure through the choke 78 are proportioned so as to maintain the pressure of the fluid in the chamber 68 at a value sufficient to hold the piston 66 in engagement with the seat rib 82 against the opposing force of the spring 92, and thereby hold the vent valve 86 away from the seat rib 90, until the pressure of the fluid in the brake pipe 1 has been reduced substantially to atmospheric pressure.

When the pressure of the fluid in the chamber 68 has been reduced to a relatively low value by the venting of fluid under pressure therefrom through the choke 78 and the passage 76, the force exerted on the piston 66 is insufficient to maintain this piston against the opposing force of the spring 92 acting through the vent valve 86 and the stem 84, and the spring 92 will thereupon move the vent valve 86 into engagement with the seat rib 90, while the piston 66 will be moved away from the seat rib 82 to the position in which it is shown in the drawing, in which position the groove 74 extends around the piston 66. When the piston 66 is moved to this position any fluid under pressure remaining in the chambers 16 and 17, and in the chamber 68 at the face of the piston 66, can escape therefrom at a rapid rate through the groove 74 around the piston 66, and thence to the atmosphere by way of the passage 72. The chambers 16 and 17, therefore, will be reduced substantially to atmospheric pressure.

On movement of the piston 10 to the application position, the passage 112 is in communication with the chambers 16 and 17 so that the pressure of the fluid in the chambers 110 and 132 at the face of the diaphragm 102 reduces as the pressure of the fluid in the pressure chamber reduces, and when the pressure on the diaphragm 102 has been reduced sufficiently, the diaphragm will be moved downwardly by the spring 105 into engagement with the seat rib 103.

In addition, the pressure of the fluid in the chambers 124 and 128 will reduce as the pressure in the chambers 16 and 17 reduces, and as the pressures on opposite sides of the diaphragm 122 are substantially equal, the valve element 144 will be held away from the valve 138 by the spring 148, while the diaphragm will be held against the projections 152.

On a subsequent increase in the pressure of the fluid in the brake pipe 1 to effect the release of the brakes, fluid under pressure flows from the brake pipe by way of the branch pipe 14 to the passage 13, and to the chamber 12 at the face of the piston 10.

When the pressure of the fluid in the chamber 12 has increased to a predetermined relatively low value, the force exerted by this fluid under pressure on the piston 10, together with the force exerted by the spring 26 acting through the piston stem 22, is sufficient to cause the piston 10 to be moved away from the gasket 162, if it has not already been moved away from the gasket by the spring 26 acting alone.

On this movement of the piston 10, the stem 22 and the auxiliary slide valve 19 are moved relatively to the main slide valve 18, and the auxiliary slide valve 19 is moved to a position to cover the end of the passage 160 through the main slide valve 18. As the piston 10 moves towards the normal release position, the main slide valve 18 is moved to cut off communication between the passages 44 and 166 by way of the cavity 164 so that communication between the emergency reservoir 4 and the brake cylinder 2 is cut off.

In addition, on this movement of the main slide valve 18, the end of the slide valve covers the end of the passage 70 to cut off communication between the valve chamber 16 and the passage 70, while the slide valve 18 is moved to a position in which the port 168 therethrough communicates with the passage 70.

After a certain amount of movement of the piston 10, it will be moved to a position to open communication between the chamber 12 and the port through which fluid under pressure is supplied from the chamber 12 to the passage 112 leading to the chamber 110 at the face of the diaphragm 102 of the valve means 100. Fluid under pressure thus supplied to the chamber 110 acts on the area of the diaphragm 102 within the seat rib 103, and when the brake pipe pressure has been increased to a predetermined degree sufficient to overcome the pressure of the spring 105, the diaphragm 102 will be moved from its seat so as to open communication from the brake pipe to the chamber 132, and through the passage 130 to the operating chamber 128.

As explained above, fluid under pressure will be supplied to the chamber 128 at a rate more rapid than fluid may flow from this chamber through the port 145 to the chamber 124, and thence to the valve chamber 16 and pressure chamber 17, and as a result, the pressure of the fluid in the chamber 128 will increase more rapidly than the pressure of the fluid in the chamber 124 is increased, and the diaphragm 132 will be moved upwardly against the spring 148 so that the seat rib 146 on the valve element 144 engages the sealing gasket carried by the valve 138 to cut off the flow of fluid through the port 145.

On operation of the valve mechanism 120 to cut off the flow of fluid through the port 145, fluid from the brake pipe will flow through the restricted port 134 to the chamber 124, and through the passage 126 to the valve chamber 16 and the pressure chamber 17 to increase the pressure of the fluid in these chambers.

The choke 134 is of very small capacity, and as a result there will be a relatively slow increase in the pressure of the fluid in the chambers 16 and 17, and in the chamber 124 of the valve mechanism 120.

During the release of the brakes after an emergency application, the pressure of the fluid in the brake pipe is increased at the relatively rapid rate. This rapid increase in brake pipe pressure, especially at the head end of the train, is sufficient to cause movement of the piston 10 to its inner release position against the resistance of the spring 36 exerted through the plunger 30, and the slide valve 18 is moved to a position in which the cavity 164 therein establishes communication between the passage 166 and the passage 62 leading to the accelerated release check valves 60 and 54.

Upon movement of the main slide valve 18 to this position, fluid under pressure will flow from the brake cylinder 2 and the auxiliary reservoir, not shown, by way of the pipe and passage 166 and the cavity 164 in the main slide valve 18 to the passage 62, and through this passage pass the ball check valve 60 to the chamber within the seat rib 58. On an increase in the pressure of the fluid in the chamber within the seat rib 58, the accelerated release check valve 54 is moved away from its seat against the spring 56, and fluid under pressure will flow to the chamber 50, and thence by way of the passage 52 to the passage 13, which communicates with the chamber 12 at the face of the piston 10, and with the branch pipe 14 leading to the brake pipe 1, so as to increase the pressure of the fluid in the brake pipe and in the chamber 12.

Fluid under pressure thus supplied to the brake pipe causes a local increase in brake pipe pressure at each car which is transmitted serially throughout the train so as to insure movement of the pistons 10 of the emergency portions of the brake controlling valve devices to their inner release positions.

When the pressure of the fluid in the brake cylinder 2 and the auxiliary reservoir, not shown, and in the brake pipe 1 has substantially equalized by the flow of fluid under pressure from the brake cylinder and the auxiliary reservoir to the brake pipe, the accelerated release check valve 54 is moved into engagement with the seat rib 58 by the spring 56 so as to cut off further flow of fluid under pressure from the brake cylinder to the brake pipe, and to prevent back flow of fluid under pressure from the brake pipe to the brake cylinder 2.

If for any reason the increase in the pressure of the fluid in the brake pipe is not sufficient to immediately cause movement of the piston 10 to the inner release position against the spring 36, as may occur at the rear of a long train, or in a train which includes a number of cars equipped with older types of brake controlling valve devices, the valve mechanism 120 operates to insure movement of the piston 10 to the inner release position.

The pressure of the fluid in the brake pipe, and in the chamber 12 at the face of the piston 10, will increase more rapidly than the pressure of the fluid in the valve chamber 16 is increased by flow of fluid thereto from the brake pipe through the choke 134. As a result there will be a gradually increasing differential between the pressure of the fluid in the chambers 12 and 16 on the opposite sides of the piston 10, and a corresponding gradual increase in the force tending to move the piston 10 against the resistance of the spring 36. When this differential has increased to a predetermined amount, the force exerted on the piston 10 is great enough to move it against the spring 36, and the piston and the slide valve 18 will thereupon be moved to the inner release position.

During the time that the piston 10 and the main slide valve 18 are in the inner release position, fluid under pressure continues to flow from the chamber 12 through the choke 134 to the chambers 16 and 17 and to the chamber 124 of the valve mechanism 120, and after a time interval, the pressure of the fluid in the chambers 16 and 17 will have increased to a value such that the force exerted on the piston 10 by the fluid under pressure in the chamber 16, together with the force exerted by the spring 36 acting on the plunger 30, is sufficient to overcome the opposing force exerted on the piston 10 by the fluid under pressure in the chamber 12. The piston 10 and the main slide valve 18 will thereupon be moved by the spring 36 acting through the plunger 30, and by the fluid under pressure in the chamber 16 acting on the piston 10, to the right, as viewed in the drawing, from the inner release position to the normal release position. The plunger 30 is able to move the slide valve 18 at this time as the plunger is engaged by the projection 34 on the end of the main slide valve 18.

When the piston 10 and the main slide valve 18 have been moved to the normal release position, the plunger 30 engages a portion of the body of the emergency portion 8 which prevents further movement of the plunger 30 with the result that the spring 36 is no longer effective to exert force on the piston 10 and the stem 22, or on the main slide valve 18, and the higher pressure of the fluid in the chamber 12 on the face of the piston 10 prevents further movement of the piston 10 by the fluid under pressure in the valve chamber 16.

The rate of flow of fluid under pressure through the choke 134 is such that the pressure of the fluid in the chambers 16 and 17 will not have increased to a value sufficient to cause the piston 10 and the main slide valve 18 to move from their inner release position to the normal release position until after the piston 10 and main slide valve 18 have been in the inner release position for a period of time long enough to permit fluid under pressure from the brake cylinder 2 and the auxiliary reservoir, not shown, to flow to the brake pipe 1 and substantially equalize the pressure of the fluid in the brake cylinder and auxiliary reservoir and in the brake pipe.

After movement of the piston 10 to the normal release position, fluid under pressure continues to flow from the chamber 12 through the choke 134 to the chamber 124, and through the passage 126 to the valve chamber 16 and the pressure chamber 17. When the pressure of the fluid in the chamber 124 has increased to a predetermined relatively high value, the diaphragm 122 is moved downwardly by the spring 148, and the valve element 144 is moved away from the valve 138 to thereby open communication through the port 145 to permit a rapid flow of fluid from the brake pipe to the chamber 124, and to the chambers 16 and 17, to increase the pressure of the fluid in these chambers at a relatively rapid rate until the pressure therein has equalized with the pressure in the brake pipe.

On an increase in the pressure of the fluid in the brake pipe 1, fluid under pressure flows therefrom by way of the branch pipe 14 and the passages in the pipe bracket section 7 to the service portion, not shown, of the brake controlling valve device 5, and when the pressure of the fluid supplied from the brake pipe 1 to the service portion has increased to a relatively high value exceeding the pressure of the fluid in the auxiliary reservoir, the service portion operates, as described in detail in the above identified patent, to release fluid under pressure from the brake cylinder 2, and to open a communication through which fluid under pressure may be supplied from the brake pipe 1 to the auxiliary reservoir, not shown, and to the emergency reservoir 4.

It will be seen that the rate of flow of fluid from the brake pipe to the valve chamber 16, and to the pressure chamber 17, is controlled by the valve mechanism 120, and that this valve mechanism is arranged so that on an increase in brake pipe pressure following either a service or an emergency application of the brakes, the supply of fluid under pressure to the valve chamber 16 and the pressure chamber 17 will be restricted with the result that there can be no overcharge of these chambers, even though fluid under pressure is supplied to the brake pipe at a pressure substantially higher than that normally carried in the brake pipe.

While one embodiment of the improved brake controlling valve device provided by my invention has been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In a fluid pressure brake equipment, in combination, a brake pipe, a brake cylinder, valve means subject to the opposing pressures of the fluid in the brake pipe and in a pressure chamber, said valve means being operative on a predetermined increase in the pressure of the fluid in the brake pipe above the pressure of the fluid in the pressure chamber to open a communication through which fluid may be supplied fro ma brake cylinder to the brake pipe, a communication controlled by said valve means through which fluid may be supplied from the brake pipe to the pressure chamber, a valve device controlling the supply of fluid from said communication to said pressure chamber, said valve device being operated on a predetermined increase in the pressure of the fluid supplied to said communication to permit the supply of fluid from said communication to said pressure chamber, and means subject to the opposing pressures of the fluid supplied by said valve device and of the fluid in said pressure chamber for regulating the rate of supply of fluid to the pressure chamber by said valve device.

2. In a fluid pressure brake equipment, in combination, a brake pipe, a brake cylinder, and an emergency valve device comprising a movable abutment subject to the opposing pressures of the fluid in a pressure chamber and of the fluid in the brake pipe, means operative by said abutment on a predetermined increase in the pressure of the fluid in the brake pipe above the pressure of the fluid in the pressure chamber to establish a communication through which fluid may be supplied from the brake cylinder to the brake pipe, valve means operated on a predetermined increase in the pressure of the fluid supplied thereto to establish a communication through which fluid may be supplied to said pressure chamber, said abutment controlling the supply of fluid from the brake pipe to said valve means, and means subject to the opposing pressures of the fluid supplied by said valve means and of the fluid of the pressure chamber for controlling the rate of supply of fluid to the pressure chamber by said valve means.

3. In a fluid pressure brake equipment, in combination, a brake pipe, a vent valve operated on the supply of fluid under pressure to vent fluid from the brake pipe, a movable abutment subject to the opposing pressure of the fluid in the brake pipe and of the fluid in a pressure chamber, said abutment controlling a communication through which fluid may flow from the pressure chamber to the brake pipe to reduce the pressure of the fluid in the pressure chamber substantially as rapidly as the pressure of the fluid in the brake pipe is reduced on a reduction in brake pipe pressure at a service rate, said abutment being operated on a reduction in brake pipe pressure at an emergency rate to move to an application position to supply fluid to the vent valve and to cut off communication between the brake pipe and said communication, valve means subject to and operated on a predetermined increase in the pressure of the fluid supplied from the brake pipe to said communication to permit the supply of fluid from said communication to the pressure chamber, and a valve device subject to the opposing pressures of the fluid in the pressure chamber and of the fluid supplied from the brake pipe by said valve means for controlling the rate of supply of fluid to the pressure chamber by said valve means.

4. In a fluid pressure brake equipment, in combination, a brake pipe, a brake cylinder, a reservoir, and a movable abutment subject to the opposing pressures of the fluid in the brake pipe and of the fluid in a pressure chamber and controlling the supply of fluid from the reservoir to the brake cylinder, said abutment controlling a communication through which fluid may flow between the brake pipe and the pressure chamber, said communication being adapted to permit fluid to flow from the pressure chamber to the brake pipe to reduce the pressure of the fluid in the pressure chamber substantially as rapidly as the pressure of the fluid in the brake pipe is reduced on a reduction in brake pipe pressure at a service rate, said abutment being operated on a reduction in brake pipe pressure at an emergency rate to move to an application position to supply fluid to the brake cylinder and to cut off communication between the brake pipe and the said communication, valve means subject to and operated on a predetermined increase in the pressure of the fluid supplied from the brake pipe to said communication to permit the supply of fluid through said communication to the pressure chamber, and a valve device subject to the opposing pressures of fluid in the pressure chamber and of the fluid supplied from the brake pipe by said valve means for controlling the rate of the supply of fluid to the pressure chamber by said valve means.

5. In a fluid pressure brake equipment, in combination, a brake pipe, an emergency valve device comprising a movable abutment subject to the opposing pressures of the fluid in the brake pipe and of the fluid in a pressure chamber, a passage controlled by said abutment through which fluid under pressure may flow from the brake pipe to the pressure chamber, valve means controlling communication through said passage, said valve means being normally operated to cut off communication through said passage and being operative to permit communication through said passage on an increase to a given value in the pressure of the fluid supplied to said passage, and a valve device subject to the opposing pressures of the fluid in the pressure chamber and of the fluid supplied by said valve means for controlling the rate of supply of fluid to the pressure chamber through said passage.

6. In a fluid pressure brake equipment, in combination, a brake pipe, and an emergency valve device comprising a movable abutment subject to the opposing pressures of the fluid in the brake pipe and of the fluid in a pressure chamber, valve means operated on a predetermined increase in the pressure of the fluid supplied thereto to supply fluid from the brake pipe to a passage through which fluid may be supplied to said pressure chamber, and a valve device subject to the opposing pressures of the fluid in the pressure chamber and of the fluid supplied to said passage for regulating the rate of supply of fluid through said passage to said pressure chamber.

7. In a fluid pressure brake equipment, in combination, a brake pipe, and an emergency valve device comprising a movable abutment subject to the opposing pressures of the fluid in the pressure chamber and of the fluid in the brake pipe, said abutment controlling a communication through which fluid under pressure may be supplied from the brake pipe to said chamber through a first restriction and a second restriction of less flow area of the first, valve means subject to the opposing pressures of the fluid in the pressure chamber and of the fluid in an operating chamber for controlling the flow of fluid through said first restriction, and means for supplying fluid to said operating chamber from a point in said communication intermediate the brake pipe and said first restriction.

8. In a fluid pressure brake equipment, in combination, a brake pipe, and an emergency valve device comprising a movable abutment subject to the opposing pressures of the fluid in the brake pipe and of the fluid in a pressure chamber and controlling a communication through which fluid may flow between the brake pipe and the pressure chamber, a restriction in said communication and proportioned to limit the rate of flow of fluid through said communication to a rate adapted to permit the pressure of the fluid in the pressure chamber to reduce substantially as rapidly as brake pipe pressure is reduced on a reduction in brake pipe pressure at a service rate, valve means subject to the opposing pressures of the fluid in the pressure chamber and of the fluid in a chamber open to said communication at a point therein intermediate said restriction and the brake pipe for controlling the flow of fluid through said communication, and a by-pass passage extending around said valve means through which fluid may flow from said communication to the pressure chamber at a less rapid rate than through said restriction.

9. In a fluid pressure brake equipment, in combination, a brake pipe, and an emergency valve device comprising a movable abutment subject to the opposing pressures of the fluid in the brake pipe and of the fluid in a pressure chamber and controlling a communication through which fluid may flow between the brake pipe and an operating chamber, valve means subject to the opposing pressures of the fluid in said operating chamber and of the fluid in the pressure chamber and controlling a passage through which fluid may flow from the pressure chamber to the operating chamber and thence to the brake pipe at a rate to reduce the pressure of the fluid in the pressure chamber substantially as rapidly as brake pipe pressure is reduced on a reduction in brake pipe pressure at a service rate, and a by-pass extending around said valve means through which fluid supplied from the brake pipe to said communication may flow to the pressure chamber at a rate substantially less rapid than through the passage controlled by said valve means.

10. In a fluid pressure brake equipment, in combination, a brake pipe, and an emergency valve device comprising a movable abutment subject to the opposing pressures of the fluid in the brake pipe and of the fluid in a pressure chamber, valve means subject to and operated upon a predetermined increase in the pressure of the fluid supplied thereto to establish a communication through which fluid may flow between the brake pipe and the pressure chamber through a first restriction or through a second restriction, means controlled by said abutment for supplying fluid from the brake pipe to said valve means, and means subject to the opposing pressures of the fluid in the pressure chamber and of a chamber open to said communication at a point therein intermediate brake pipe and said first restriction for controlling the flow of fluid through said first restriction.

11. In a fluid pressure brake equipment, in combination, a brake pipe, and an emergency valve device comprising a movable abutment subject to the opposing pressures of the fluid in the brake pipe and of the fluid in a pressure chamber and controlling a communication through which fluid may flow between the brake pipe and the pressure chamber, said communication having a restriction therein, valve means responsive to and operated on a predetermined increase in the pressure of the fluid supplied from the brake pipe to said communication to permit flow of fluid through said communication, valve mechanism subject to the opposing pressures of the fluid in the pressure chamber and of the fluid in a chamber open to said communication at a point therein intermediate said restriction and the brake pipe for controlling flow of fluid through said restriction, and a by-pass passage extending around said valve mechanism and through which fluid may flow to the pressure chamber from a point in said communication intermediate the pressure chamber and the valve means.

12. In a fluid pressure brake equipment, in combination, a brake pipe, and an emergency valve device subject to the opposing pressures of the fluid in the brake pipe and of the fluid in a pressure chamber and controlling a communication through which fluid may flow between the brake pipe and the pressure chamber, said communication having a restriction therein, valve means subject to the opposing pressures of the fluid in the pressure chamber and of the fluid in an operating chamber open to said communication at a point therein intermediate the brake pipe and said restriction for controlling flow of fluid through said communication, and means subject to and operated on a predetermined increase in the pressure of the fluid supplied from the brake pipe for supplying fluid to the pressure chamber at a restricted rate.

13. In a fluid pressure brake equipment, in combination, a brake pipe, and an emergency valve device subject to the opposing pressures of the fluid in the brake pipe and of the fluid in a pressure chamber and controlling a communication through which fluid may flow between the brake pipe and the pressure chamber, said communication having a restriction therein, valve means subject to the opposing pressures of the fluid in the pressure chamber, and of the fluid in an operating chamber open to said communication at a point therein intermediate the brake pipe and said restriction for controlling flow of fluid through said communication, valve mechanism subject to and operated on a predetermined increase in the pressure of the fluid supplied from the brake pipe for supplying fluid to the pressure chamber at a restricted rate, and means controlled by said emergency valve device for supplying fluid under pressure to said valve mechanism.

14. In a fluid pressure brake equipment, in combination, a brake pipe, and an emergency valve device comprising a movable abutment subject to the opposing pressures of the fluid in the brake pipe and of the fluid in a pressure chamber for controlling a communication through which fluid may flow between the brake pipe and an operating chamber, valve means subject to the opposing pressures of the fluid in said operating chamber and of the fluid in the pressure chamber and controlling a restricted passage through which fluid may flow from the pressure chamber to the operating chamber and thus to the brake pipe at a rate rapid enough to reduce the pressure of the fluid in the pressure chamber substantially as rapidly as brake pipe pressure is reduced on a reduction in brake pipe pressure at a service rate, and means subject to and operated on a predetermined increase in the pressure of the fluid supplied thereto from the brake pipe for supplying fluid to the pressure chamber at a restricted rate.

15. In a fluid pressure brake equipment, in combination, a brake pipe, and an emergency valve device comprising a movable abutment subject to the opposing pressures of the fluid in the brake pipe and of the fluid in a pressure chamber for controlling a communication through which fluid may flow between the brake pipe and an operating chamber, valve means subject to the opposing pressures of the fluid in said operating chamber and of the fluid in the pressure chamber and controlling a restricted passage through which fluid may flow from the pressure chamber to the operating chamber and thus to the brake pipe at a rate rapid enough to reduce the pressure of the fluid in the pressure chamber substantially as rapidly as brake pipe pressure is reduced on a reduction in brake pipe pressure at a service rate, valve mechanism subject to and operated on a predetermined increase in the pressure of the fluid supplied thereto from the brake pipe for supplying fluid to the pressure chamber at a restricted rate, and means controlled by said movable abutment for supplying fluid from the brake pipe to said valve mechanism.

16. In a fluid pressure brake equipment in combination, a brake pipe, and an emergency valve device comprising a movable abutment subject to the opposing pressures of the fluid in the brake pipe and of the fluid in a pressure chamber for controlling a communication through which fluid may flow between the brake pipe and an operating chamber, valve means subject to the opposing pressures of the fluid in said operating chamber and of the fluid in the pressure chamber and controlling a restricted passage through which fluid may flow from the pressure chamber to the operating chamber and thus to the brake pipe at a rate rapid enough to reduce the pressure of the fluid in the pressure chamber substantially as rapidly as brake pipe pressure is reduced on a reduction in brake pipe pressure at a service rate, valve mechanism responsive to and operated on a predetermined increase in the pressure of the fluid supplied from the brake pipe to the communication connecting the operating chamber and the brake pipe to permit flow of fluid through said communication, and means controlled by said valve mechanism for supplying fluid from the brake pipe to the pressure chamber at a restricted rate.

17. In a fluid pressure brake equipment, in combination, a brake pipe, and an emergency valve device comprising a movable abutment subject to the opposing pressures of the fluid in the brake pipe and of the fluid in a pressure chamber for controlling a communication through which fluid may flow between the brake pipe and an operating chamber, valve means subject to the opposing pressures of the fluid in said operating chamber and of the fluid in the pressure chamber and controlling a restricted passage through which fluid may flow from the pressure chamber to the operating chamber and thus to the brake pipe at a rate rapid enough to reduce the pressure of the fluid in the pressure chamber substantially as rapidly as brake pipe pressure is reduced on a reduction in brake pipe pressure at a service rate, valve mechanism responsive to and operated on a predetermined increase in the pressure of the fluid supplied from the brake pipe to the communication connecting the operating chamber and the brake pipe to permit flow of fluid from said communication, and a by-pass passage connecting the pressure chamber with said communication at a point therein intermediate the valve mechanism and the operating chamber, said by-pass passage being adapted to permit fluid to flow from said communication to the pressure chamber at a restricted rate.

ELLIS E. HEWITT.